(12) United States Patent
Eberlein et al.

(10) Patent No.: US 6,343,665 B1
(45) Date of Patent: Feb. 5, 2002

(54) MOTOR-ASSISTED HAND-MOVABLE CART

(75) Inventors: Herbert Eberlein, Bubesheim; Peter Kriz, deceased, late of Wellheim/Teck, both of (DE), by Helga Kriz, legal representative

(73) Assignee: Wanzl Metallwarenfabrik GmbH, Leipheim (DE)

( * ) Notice: Subject to any disclaimer, the term of this patent is extended or adjusted under 35 U.S.C. 154(b) by 0 days.

(21) Appl. No.: 09/485,857

(22) PCT Filed: Jun. 15, 1999

(86) PCT No.: PCT/DE99/01741

§ 371 Date: Feb. 17, 2000

§ 102(e) Date: Feb. 17, 2000

(87) PCT Pub. No.: WO99/65755

PCT Pub. Date: Dec. 23, 1999

(51) Int. Cl.[7] .................................................. B62B 3/02
(52) U.S. Cl. ........................ 180/19.1; 180/11; 180/15; 280/33.991
(58) Field of Search .............................. 180/19.1, 68.5, 180/65.1, 65.8, 11, 13, 14 R, 15, 6.2; 280/33.992, 33.991, DIG. 4, 79.11, 33.998

(56) References Cited

U.S. PATENT DOCUMENTS

| | | | |
|---|---|---|---|
| 2,414,277 A | * 1/1947 | Shepard, Jr. et al. | ......... 280/49 |
| 4,096,920 A | * 6/1978 | Heyn | ........................... 180/11 |
| 4,137,984 A | * 2/1979 | Jennings et al. | ............... 180/98 |
| 4,221,273 A | 9/1980 | Finden | |
| 4,458,906 A | * 7/1984 | Lamson | .................... 280/47.34 |
| 4,826,186 A | 5/1989 | Hagelin | |
| 5,064,012 A | * 11/1991 | Losego | ........................ 180/19.1 |
| 5,746,282 A | 5/1998 | Fujiwara et al. | |

FOREIGN PATENT DOCUMENTS

| | | |
|---|---|---|
| DE | 196 14 411 A1 | 10/1996 |
| EP | 0 267 817 A1 | 5/1988 |
| EP | 0 352 647 A2 | 1/1990 |
| EP | 0 769 286 A2 | 4/1997 |
| GB | 2 183 566 A | 10/1987 |
| GB | 2 286567 A | 8/1995 |

* cited by examiner

Primary Examiner—Brian L. Johnson
Assistant Examiner—Tony Winner
(74) Attorney, Agent, or Firm—Burns, Doane, Swecker and Mathis, L.L.P.

(57) ABSTRACT

A motor-assisted hand-movable cart that can have an identical cart inserted into it in a space-saving manner, whereby the cart is provided with: a drive chassis having two front casters and two back casters; a pushing device; a storage device for goods; a support section below the storage device, on which is disposed at least one running wheel that is located between the two front and the two back casters, and an electromotor drive unit, this drive unit driving the at least one running wheel; and a power source for supplying the electromotor drive unit located in a space not required by a further pushcart to be inserted into the pushcart during the insertion process.

8 Claims, 2 Drawing Sheets

MOTOR-ASSISTED HAND-MOVABLE CART

BACKGROUND OF THE INVENTION

The invention relates to a motor-assisted hand-movable pushcart that can be inserted into an identical pushcart in a space-saving manner, whereby the pushcart is provided with a drive chassis having four casters and a pushing device and a storage device for goods, and whereby below the storage device is a support section on which is disposed at least one running wheel that is located between the two front and the two back casters.

Pushcarts of this type are described in more detail in U.S. Pat. No. 4,826,186 and European Patent No. 0 352 647 B1. The at least one running wheel has a stabilizing effect on the steering and pushing process in pushcarts of this type. The running wheels are furthermore disposed in such a way that the pushcarts can be pushed relatively tightly inside each other. In self-service markets, this makes it possible to save much storage space when parking or making available these pushcarts in rows. The advantages just described have caused such pushcarts to be very popular. However, if these pushcarts are heavily loaded, the same amount of pushing force must be applied as for pushcarts with no running wheel in the center. For this reason, pushcarts were developed that are provided with four wheels and/or casters and have a controllable, electromotor-driven drive unit intended to propel or move the pushcart by acting via the wheels or an additional drive wheel. One of many pushcarts of this type is described, for example, in U.S. Pat. No. 5,746,282. The drive unit hereby acts supporting during the pushing of a heavily loaded pushcart by hand. But the pushcarts mentioned last cannot be inserted inside each other in a space-saving manner.

The objective of the invention is to further develop a pushcart of this class type in such a way that if the known advantages that can be obtained with a centered running wheel and by using a controllable drive unit are utilized, the ability of inserting the pushcarts into another, identical pushcart is not adversely affected.

SUMMARY

This objective is realized in that at the support section a drive unit supplied by a power source is provided, this drive unit being intended for driving the at least one running wheel, and that the power source on the pushcart is located in at least one of the spaces not required by a pushcart to be inserted into it during the insertion process.

The objects can be achieved with a motor-assisted hand-movable cart that can have a further identical cart inserted into it in a space saving manner, whereby the cart is provided with a drive chassis having four casters, including two front casters and two back casters; a pushing device; a storage device for goods; a support section below the storage device, on which is disposed at least one running wheel that is located between the two front and the two back casters, and an electromotor drive unit, this drive unit being intended for driving the at least one running wheel; and a power source located in a space not required by further cart to be inserted into the cart during the insertion process.

It is advantageous to arrange the drive unit on the support section that exists in any case, since the running wheel is located there. If the support section is arranged so as to be swivelable about a horizontal axis, the weight of the drive unit contributes in pushing the running wheel even more against the ground, in this way increasing the drive force of the running wheel. It is further useful, to arrange the power source that is usually made up of batteries in those spaces not required by one of the two pushcarts when two pushcarts are inserted inside each other. Such areas are usually located below the storage device in the front part of the drive chassis and in the back part below the pushing device, whereby they are in the latter case arranged higher than the storage device, however. In this way, the power source and the drive unit do not adversely affect either the space-saving inserting inside of each other of the pushcarts, nor do they claim space or room on or at the storage device.

The invention is explained in more detail in reference to exemplary embodiments, whereby the exemplary embodiments preferably take their orientation from the construction of those pushcarts described in the initially mentioned European patents.

DRAWINGS

DETAILED DESCRIPTION OF THE PREFERRED EMBODIMENTS

Figure 1:
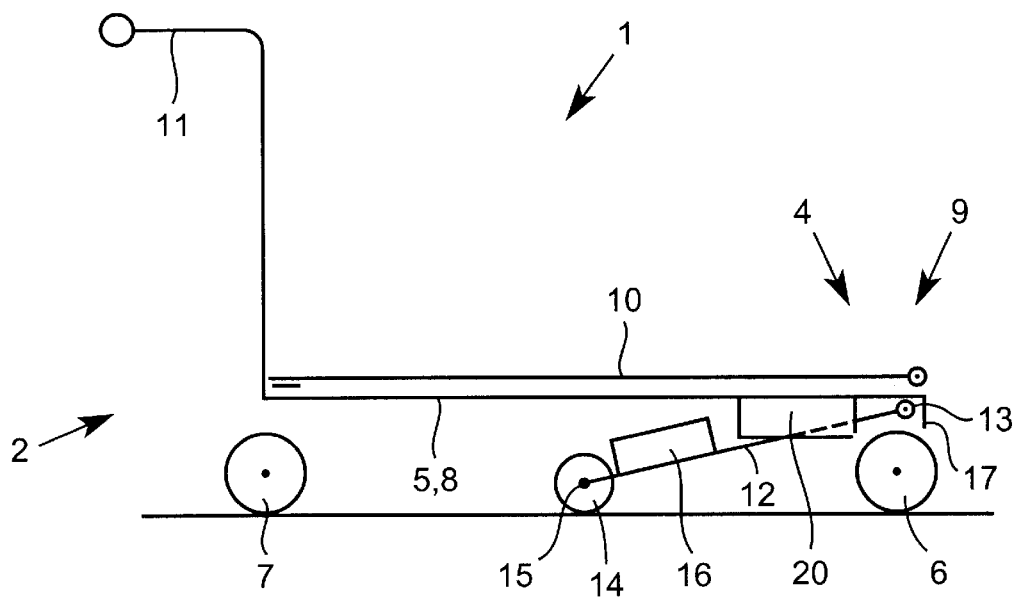
FIG. 1 shows a pushcart with swivelable support section.

The pushcart shown in FIG. 1 has been designed in a known manner in such a way that it can be inserted in a space-saving manner into an identical pushcart 1. Its drive chassis 5 equipped with four casters 6, 7 is therefore constructed in the form of a taper, and its storage device 10 intended for holding goods, for example a loading platform, is attached to the drive chassis in a liftable manner. At the rear end 2 of the pushcart 1, a pushing device 11 that points backward is located. Below the storage device 10 and between the longitudinal bars 8 of the drive chassis 5 is located a support section 12 that is positioned at the front end 9 of the drive chassis 5 in a manner swivable about a horizontal axis 13. The support section 12 is intended for supporting a running wheel 14 whose axis 15 extends transversely to the longitudinal direction of the pushcart 1. The running wheel 14 is located, preferably arranged in a center position, between the front and back casters 6, 7. The support section 12 is provided with an electromotor drive unit 16 supplied by a power source 20 and intended for driving the running wheel 14. The running wheel 14 can be driven, for example, via two gear wheels or a friction wheel. But the preferred embodiment is a drive unit 16 in which the drive motor and the at least one running wheel 14 are combined into a single assembly. In the front part 4 of the pushcart 1, a power source 20 is arranged below the storage device 10. The power source 20, usually formed by rechargeable batteries, is attached longitudinally to the drive chassis 5 on at least one of the two sides of the support section 12.

Figure 2:
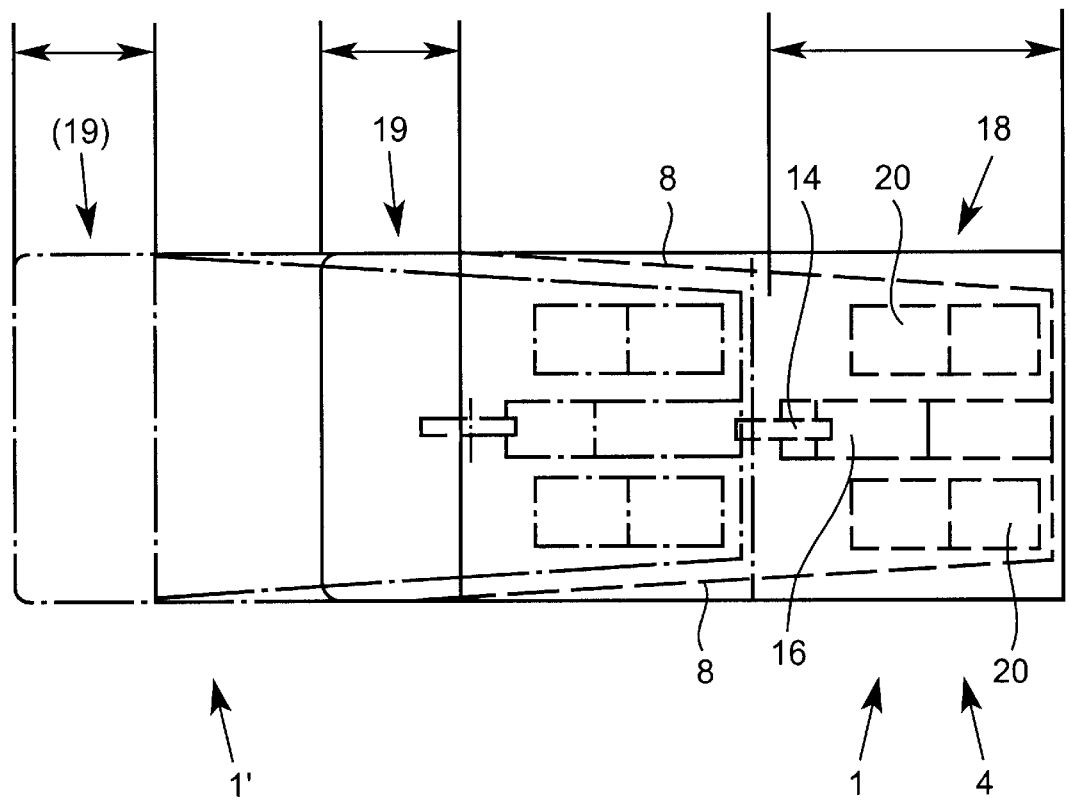
FIG. 2 shows a top view of two such pushcarts, inserted inside each other.

FIG. 2 shows a top view of two pushcarts 1, 1' according to FIG. 1 inserted inside each other in a space-saving manner. The pushcart 1' shown in the left back has been inserted in a space-saving manner into the pushcart 1 in front of it which is shown on the right. Since the pushcarts 1, 1' can be only partially inserted inside each other, spaces 18, 19 which are only claimed by one of the pushcarts 1 or 1' remain. In expert language, these spaces 18, 19 are also called "stacking dead spaces". In the drawing, the spaces 18, 19 are identified by the two double arrows. Space 18 is located in the frontal area 4 of the pushcart 1, while the rear space 19 extends below the pushing device 11. The drawing clearly shows that the power source 20 arranged on both sides of the support section 12 is located in the space 18. Space 18 is not claimed by the inserted pushcart 1'. In this way, space remains for the practical accommodation of the power source 20 on pushcart 1. It is also advantageous that the drive unit 16 is located advantageously in space 18 guaranteeing the tightest possible insertion together of pushcarts 1, 1'. In addition, it is also mentioned that a device 17 intended for lifting the support section 12 could be provided on each pushcart 1, 1' (see FIG. 1), for example as described in EP 0 352 647 B1.

Figure 3:
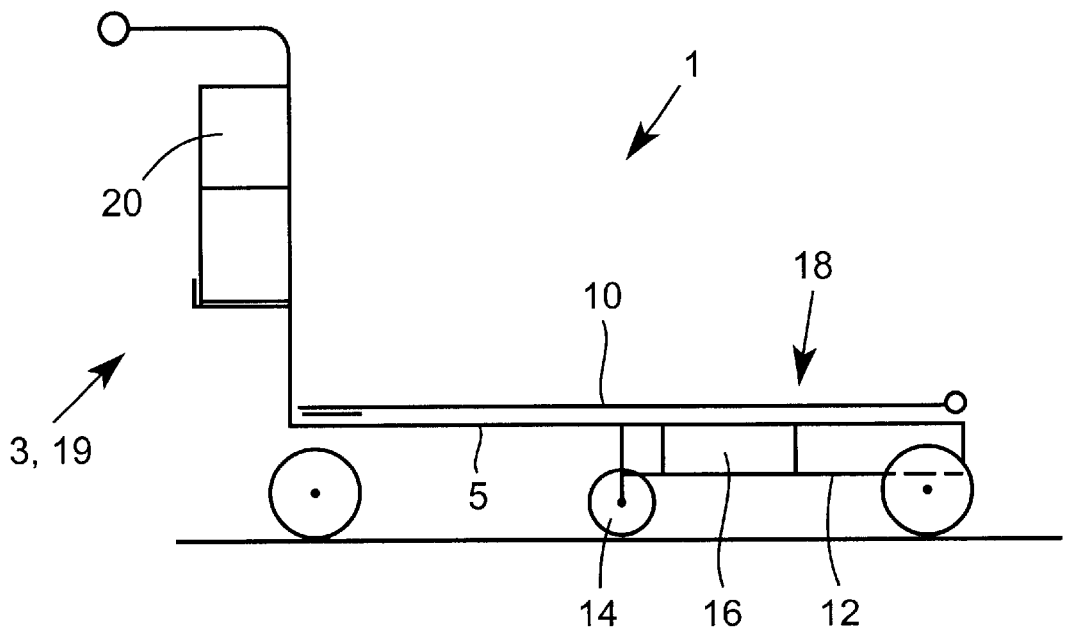
FIG. 3 shows a pushcart with a support section arranged in a stationary manner; and, FIG. 4 shows a top view of the pushcart shown in FIG. 3.
Figure 4:
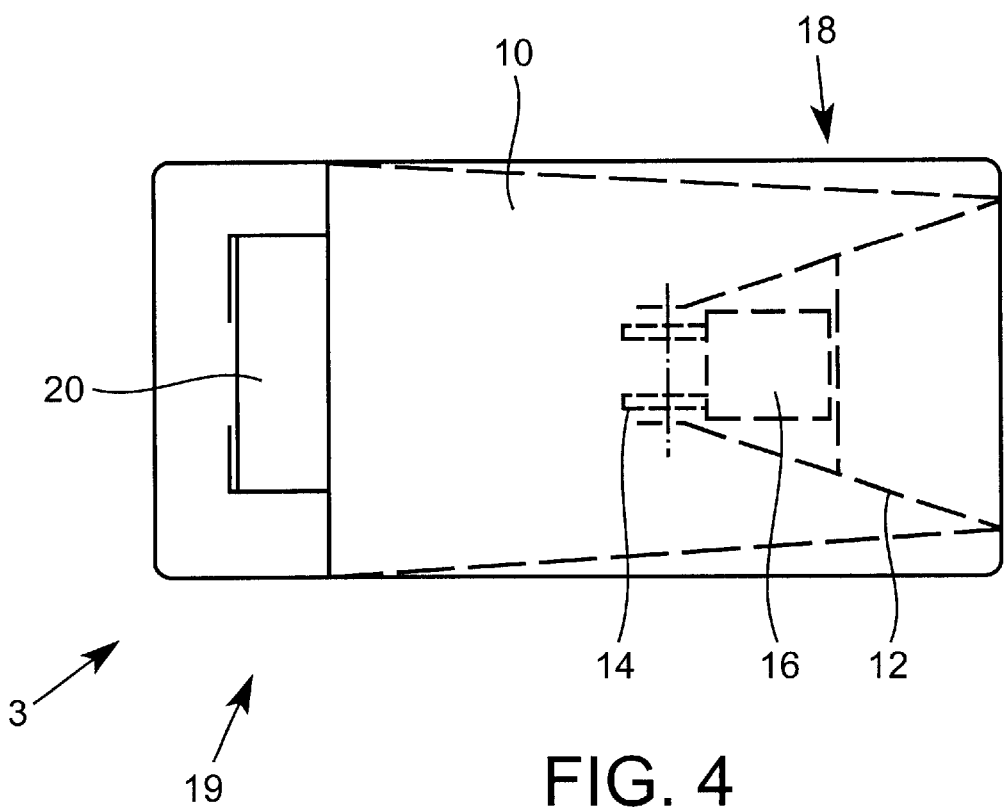

FIG. 3. and FIG. 4 show a pushcart 1 whose drive chassis 5 and supports section 12 can be designed in such a way as disclosed in U.S. Pat. No. 4,826,186. The support section 12 is arranged in a stationary manner on the drive chassis. Instead of only a single running wheel 14, two running wheels 14 are provided in an equivalent manner. Located on support section 12 and within the space 18, a drive unit 16 has again been provided, said drive unit being intended in the manner previously described for driving at least one of the two running wheels 14. The drive unit 16 is located in space 18, while the power source 20 in this exemplary embodiment is located in space 19 that extends in the rear part 3 of the pushcart 1 below the pushing device 11 and is located higher than the storage device 10. In this exemplary embodiment the power source 20 and the drive unit 16 also are located in at least one of the spaces, 18, 19 not claimed by a pushcart 1, 1' that is inserted during the insertion process. In general, the power source 20 also could be located in both spaces 18, 19.

What is claimed is:

1. A motor-assisted hand-movable cart that can have an identical cart inserted into it in a space-saving manner, whereby the cart comprises:
   a drive chassis having two front casters and two back casters;
   a pushing device;
   a storage device for goods;
   a support section below the storage device, on which support section is disposed at least one running wheel that is located between the two front and the two back casters, and an electromotor drive unit, this drive unit for driving the at least one running wheel; and
   a power source for supplying the electromotor drive unit located in a second space; wherein the second space is located below the storage device and in a front part of the pushcart.

2. The motor-assisted hand-movable cart as claimed in claim 1, wherein the drive unit is designed as a single assembly comprising a drive motor and the at least one running wheel.

3. The motor-assisted hand-movable cart as claimed in claim 1, wherein the drive unit is located in a space not required by a further pushcart to be inserted into the pushcart during the insertion process.

4. The motor-assisted hand-movable cart as claimed in claim 1, wherein the power source is located adjacent the support section on the drive chassis.

5. The motor-assisted hand-movable cart as claimed in claim 1, wherein the power source is located on both sides of the support section on the drive chassis.

6. A motor-assisted hand-movable cart that can have an identical cart inserted into it in a space-saving manner, whereby the cart comprises:
   a drive chassis having two front casters and two back casters;
   a pushing device;
   a storage device for goods;
   a support section below the storage device, on which support section is disposed at least one running wheel that is located between the two front and the two back casters, and an electromotor drive unit, this drive unit for driving the at least one running wheel; and
   a power source for supplying the electromotor drive unit located in a second space; wherein the second space is in a rear part of the pushcart, located higher than the storage device and below the pushing device.

7. A motor-assisted hand-movable cart, comprising:
   a frame having two front casters and two back casters;
   a pushing device connected to the frame;
   a storage device for storing goods, the storage device being connected to the frame;
   a support section connected to the frame below the storage device, on which support section is disposed at least one running wheel that is located between the two front and the two back casters;
   an electromotor drive unit for driving the at least one running wheel;
   a power source for supplying power to the electromotor drive unit;
   the cart including a first space for receiving a portion of an identical cart when the cart and the identical cart are stacked together in a telescoping manner, and the cart including a second space that is distinct from the first space and which is not occupied by any portion of the identical cart when the cart and the identical cart are stacked together in the telescoping manner; and
   the power source is located in the second space;
      wherein the storage device is connected to the frame in a liftable manner and the second space is located below the storage device an in a front part of the cart.

8. A motor-assisted hand-movable cart comprising:
   a frame having two front casters and two back casters;
   a pushing device connected to the frame;
   a storage device for storing goods, the storage device being connected to the frame;
   a support section connected to the frame below the storage device, on which support section is disposed at least one running wheel that is located between the two front and the two back casters;
   an electromotor drive unit for driving the at least one running wheel;
   a power source for supplying power to the electromotor drive unit;
   the cart including a first space for receiving a portion of an identical cart when the cart and the identical cart are stacked together in a telescoping manner, and the cart including a second space that is distinct from the first space and which is not occupied by any portion of the identical cart when the cart and the identical cart are stacked together in the telescoping manner; and
   the power source is located in the second space;
      wherein the storage device is connected to the frame in a liftable manner and the second space is in a rear part of the cart and located higher than the storage device and below the pushing device.

* * * * *

UNITED STATES PATENT AND TRADEMARK OFFICE
CERTIFICATE OF CORRECTION

PATENT NO. : 6,343,665 B1
DATED : February 5, 2002
INVENTOR(S) : Herbert Eberlein et al.

It is certified that error appears in the above-identified patent and that said Letters Patent is hereby corrected as shown below:

<u>Title page</u>,
Item [75], Inventors, "Wellheim/Teck" should be -- Weilheim --.

<u>Column 3</u>,
Line 30, "by a pushcart 1,1'" should be -- by a pushcart 1' --.

<u>Column 4</u>,
Line 39, "an" should be -- and --.

Signed and Sealed this

Twelfth Day of August, 2003

JAMES E. ROGAN
*Director of the United States Patent and Trademark Office*